US012042676B2

(12) United States Patent
Ramanathan et al.

(10) Patent No.: US 12,042,676 B2
(45) Date of Patent: Jul. 23, 2024

(54) RESPIRATOR MASK

(71) Applicants: Anantha Kumarasamy Ramanathan, Bellerose, NY (US); Mythily Ramanathan, Bellerose, NY (US)

(72) Inventors: Anantha Kumarasamy Ramanathan, Bellerose, NY (US); Mythily Ramanathan, Bellerose, NY (US)

( * ) Notice: Subject to any disclaimer, the term of this patent is extended or adjusted under 35 U.S.C. 154(b) by 660 days.

(21) Appl. No.: 17/240,507

(22) Filed: Apr. 26, 2021

(65) Prior Publication Data

US 2021/0339063 A1 Nov. 4, 2021

Related U.S. Application Data

(60) Provisional application No. 63/019,491, filed on May 4, 2020.

(51) Int. Cl.
*A62B 23/02* (2006.01)
*A41D 13/11* (2006.01)

(52) U.S. Cl.
CPC ............ *A62B 23/025* (2013.01); *A41D 13/11* (2013.01); *A41D 2500/00* (2013.01)

(58) Field of Classification Search
CPC ...... A41D 13/11–1138; A41D 2500/00; A41D 13/113; A41D 13/1161; A62B 18/025; A62B 23/06
See application file for complete search history.

(56) References Cited

U.S. PATENT DOCUMENTS

| | | | | |
|---|---|---|---|---|
| 2,081,779 A * | 5/1937 | Titus | A41D 13/1192 128/206.16 |
| 3,500,825 A * | 3/1970 | Andersson | A41D 13/11 128/206.19 |
| 4,867,148 A * | 9/1989 | Gomez | A61M 16/106 128/202.28 |
| 2007/0051370 A1* | 3/2007 | Baker | A41D 13/11 128/206.19 |
| 2009/0114228 A1* | 5/2009 | Kirschner | A01M 31/008 128/206.13 |
| 2009/0151733 A1* | 6/2009 | Welchel | A41D 13/113 128/863 |
| 2013/0186414 A1* | 7/2013 | Suzuki | A41D 13/1161 128/863 |
| 2018/0160749 A1* | 6/2018 | Kim | A41D 13/1107 |

FOREIGN PATENT DOCUMENTS

| | | |
|---|---|---|
| JP | 3155829 U * | 12/2009 |
| KR | 20070112442 A * | 11/2007 |
| KR | 200474665 Y1 * | 10/2014 |

* cited by examiner

*Primary Examiner* — Michael R Reid
*Assistant Examiner* — Tina Zhang
(74) *Attorney, Agent, or Firm* — Bruce A. Lev

(57) ABSTRACT

An improved respirator mask that provides a tighter fit around a user's face and results in an improved seal therebetween and thereby eliminates the need for stocking different sized protective face masks and fit testing, and further provides greater protection due to the improved seal between the mask and the user's head and face. The improved respirator mask can further be fitted with specialized filters, exhalation valves, and eye guards.

10 Claims, 7 Drawing Sheets

RESPIRATOR MASK

CROSS-REFERENCE TO RELATED APPLICATION

The present application is related to and claims priority from prior provisional application Ser. No. 63/019,491, filed May 4, 2020 which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

The present invention relates generally to the field of protective face masks and more specifically relates to protective face masks used to filter out hazardous pollution and airborne germs and viruses.

2. Description of the Related Art

Previous protective face masks usually only cover the portals of inhalation (nose and mouth) or may include eye protection or may cover the entire head.

The first use of surgical mask is attributed to French surgeon Paul Berger, in 1897. Famous surgeons such as Theodore Billroth and William Halstedt operated without wearing masks. During the Spanish flu pandemic of 1918-1920 the wearing of masks was widespread in the community.

Masks are used for the following reasons:

1. Protect the wearer from liquid splashes, droplets and inhaled particles.
2. Protect others by limiting exhaled particles.
3. Assist in Ventilation The problems with masks that may affect their efficacy are:

1. Filtration efficiency
2. Impedance of the pores due to clogging of pores by trapped filtered particles
3. Leaks
4. Fogging of eyewear (an effect of suboptimal fit)
5. Rebreathing
6. Discomfort due to prolonged wear Respirators protect the user from inhaled particles. The efficacy of a respirator depends on:

1. Tightness of fit
2. Filtration capability

The respirators may be passive or powered. Passive respirators depend on inhalation and exhalation by the wearer to create the pressure differential for the movement of air. Powered respirators provide air from a compressed source.

Current day respirator and medical mask filters are made of mats of nonwoven fibrous materials, such as wool felt, fiberglass paper, or polypropylene. Spunbound or melt blown polypropylene is the material of choice.

The filtered particles adhere to the fabric without blocking air flow due to

1. Tortuous path
2. Inertial impaction [Larger particles (>1μ) are trapped in the fibers]
3. Diffusion [particles<0.1μ are trapped as they move through the fabric by diffusion (Brownian movement) in a complex pathway]
4. Electrostatic attraction [Between oppositely charged particles and fibers—all sized particles]

The following properties of the material affect the effectivity of the mask:

1. Fiber thickness (down to micron or submicron diameters)
2. Density of fibers per unit area
3. Density of bond points
4. Orientation of fibers
5. Hydrophilicity (polypropylene is hydrophobic and should be rendered hydrophilic in order to trap aqueous particles)

Once particles are captured by a filter, they are held tightly to the fibers through van der Waals bonding and other forces. When filters are become loaded with trapped particles their efficiency increases until the accumulated trapped particles start to impede the air flow.

Masks are tested for:

1. Bacterial filtration efficiency in vitro (BFE)
2. Breathing resistance (AP)
3. Splash resistance
4. Flammability It is hypothesized that most of the contaminants enter through face seal leakage rather than filter penetration.

Standard Mask Design:

A three-layered laminate structure is pleated and sized to cover the wearer's nose and mouth. The innermost layer (the first ply) comes in contact with the wearer's face and is made of nonwoven, airlaid paper material that is resistant to liquid and is designed to be soft. It is intended to prevent facial hair, perspiration, and saliva from interfering with or exiting the facemask.

The second layer is made of nonwoven, liquid-resistant, melt blown, polypropylene material designed to act as a barrier against bacteria, body fluids, and particulate contaminants.

The outermost layer (the third ply) is made of nonwoven, liquid-resistant, thermobond polypropylene fabric designed to be the first contact filter barrier layer against body fluids and liquid particulate contaminants from outside the wearer's mask. The three-ply structure is fused through ultrasonic heat-sealing.

The typical material used to manufacture surgical face masks are polypropylene with 20 gsm made using spunbond technology and 25 gsm polypropylene non-woven sheet made using meltblown technology.

The surgical face masks are made in different sizes like 17.5×9.5 cm for adult, 14.5×9.5 cm for child use and 12×7 cm for infants. Polypropylene, polystryrene, polycarbonate, polyethylene, polyester etc. are suitable for manufacturing surgical face masks. The suitable polymers are converted as a non-woven sheet using spunbond technology or electrostatically produced web from solvents. The methods of electrostatically produced web have uniform web density giving a high degree of filtration efficiency and less web weight.

N95 masks come in different sizes and are fit tested before being authorized for use by health professionals in hazardous situations.

Thus, a need exists for improved protective face masks that can create an improved seal between the mask and the user's head and face and filter out all hazardous pollution and airborne germs and viruses that might cause harm to a person.

BRIEF SUMMARY OF THE INVENTION

In view of the foregoing disadvantages inherent in the previous protective face mask technologies, the present invention provides an improved respirator mask that provides a tighter fit around a user's face and results in an improved seal therebetween and thereby eliminates the need for stocking different sized protective face masks and fit testing, and provides greater protection due to the improved seal between the mask and the user's head and face. The unique design is amenable to being fitted with specialized filters and exhalation valves. Eye guards can also be fitted.

The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments for the present invention, Improved Respirator Mask, constructed and operative according to the teachings of the present invention.

Figure 1:
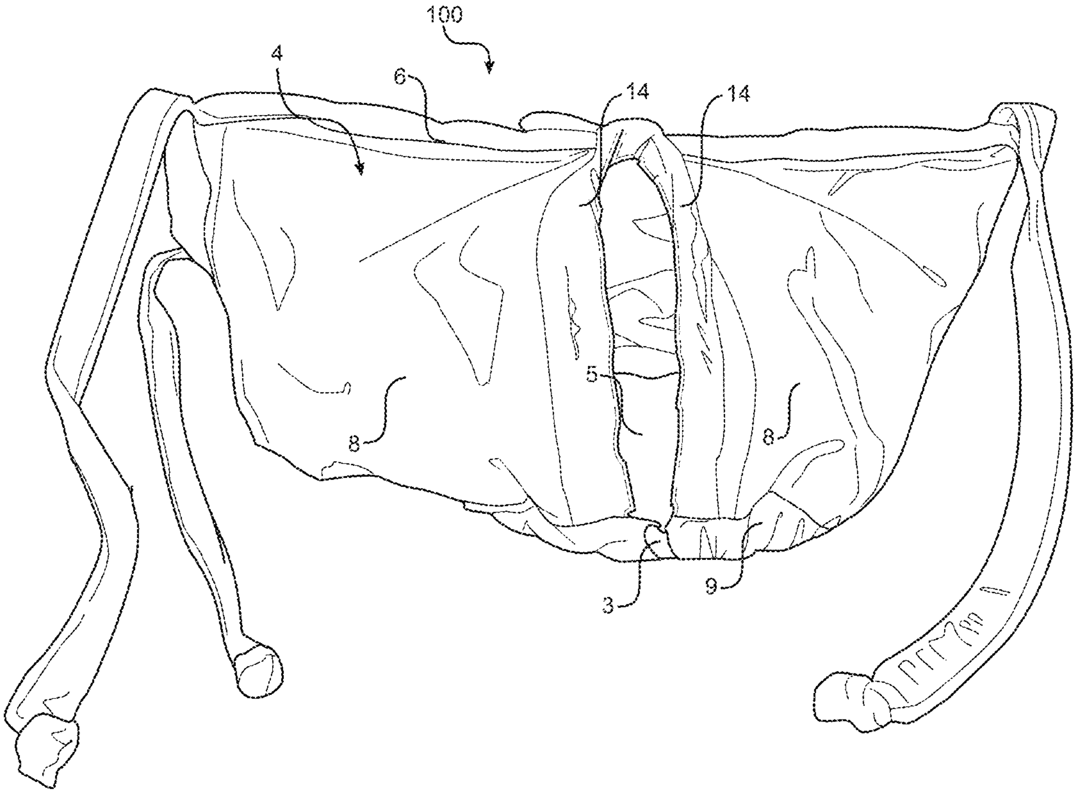
FIG. 1 shows a back view of the improved respirator mask of the present invention with the nose piece extended and ready for use.
Figure 2:
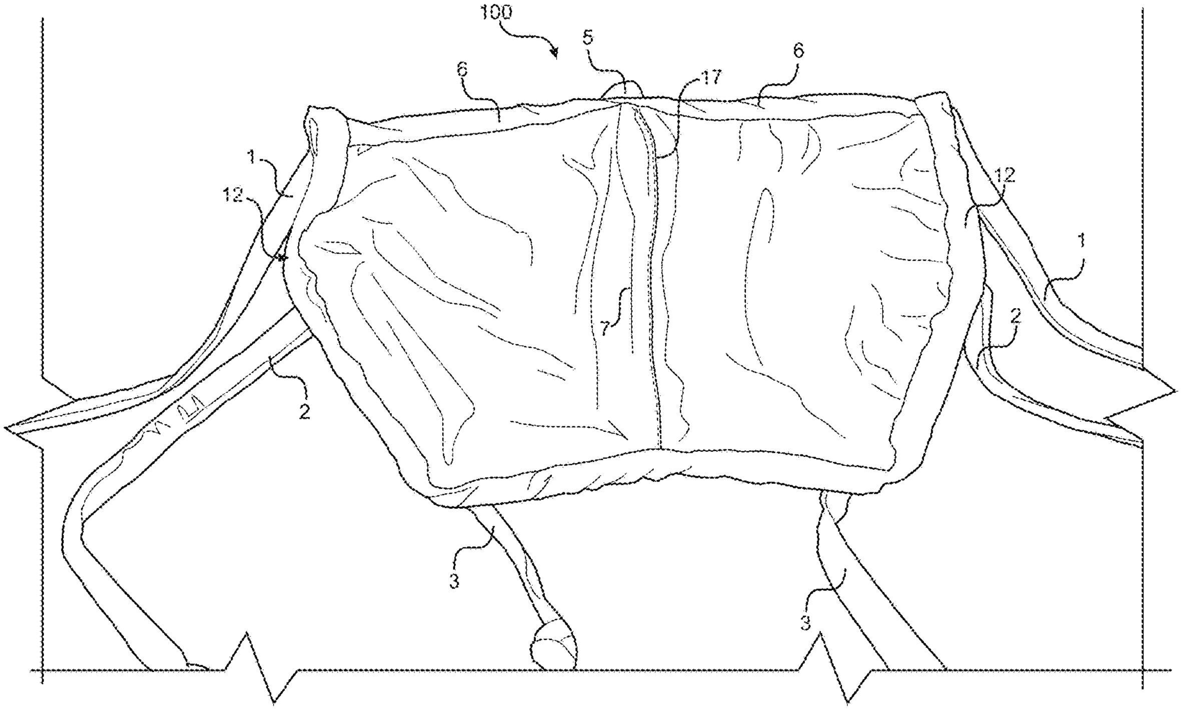
FIG. 2 shows a front view of the improved respirator mask of the present invention.
Figure 3:
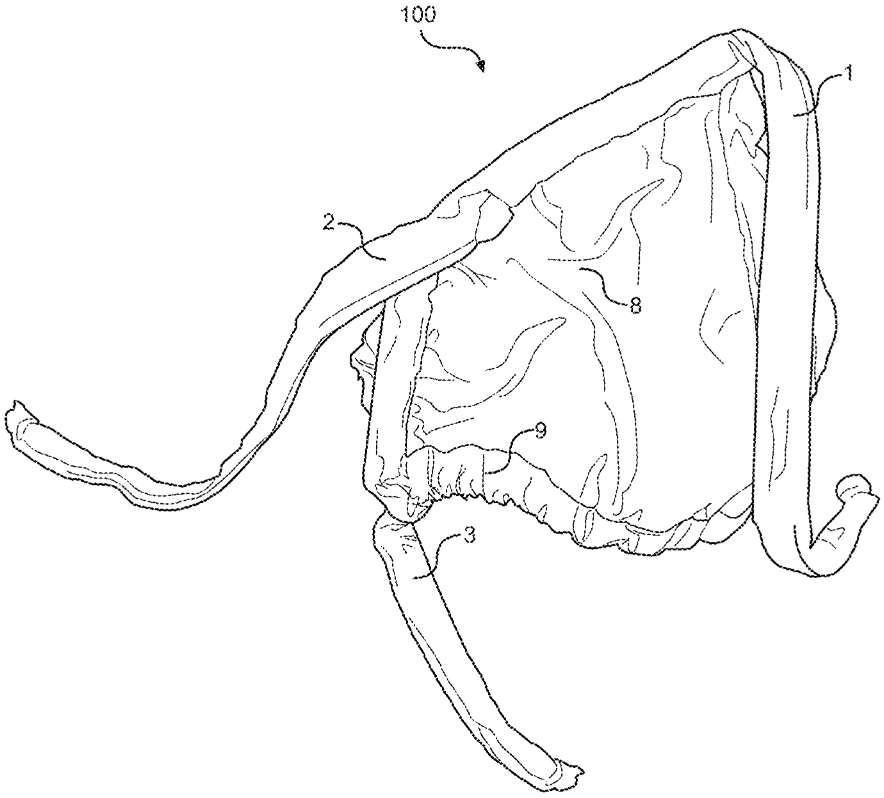
FIG. 3 shows a side view of the improved respirator mask of the present invention with the nose piece extended and ready for use.
Figure 4:
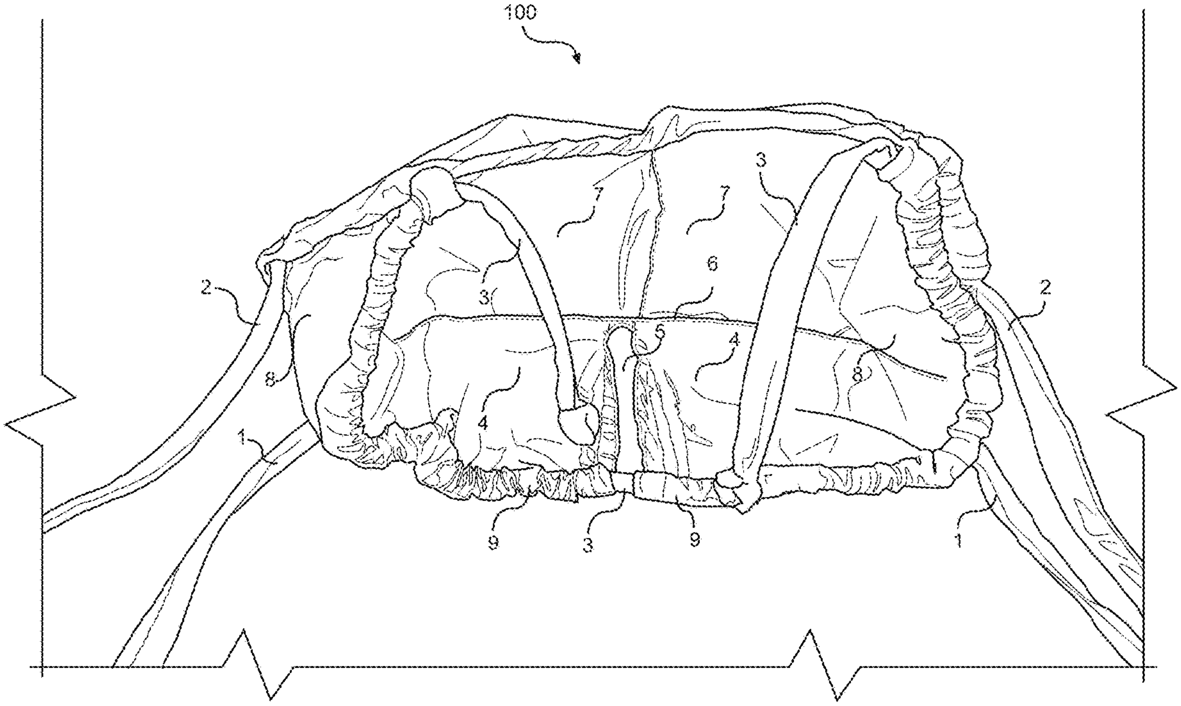
FIG. 4 shows a bottom perspective view of the improved respirator mask of the present invention, wherein the nose piece is in between an in-use configuration and a stored configuration.
Figure 5:
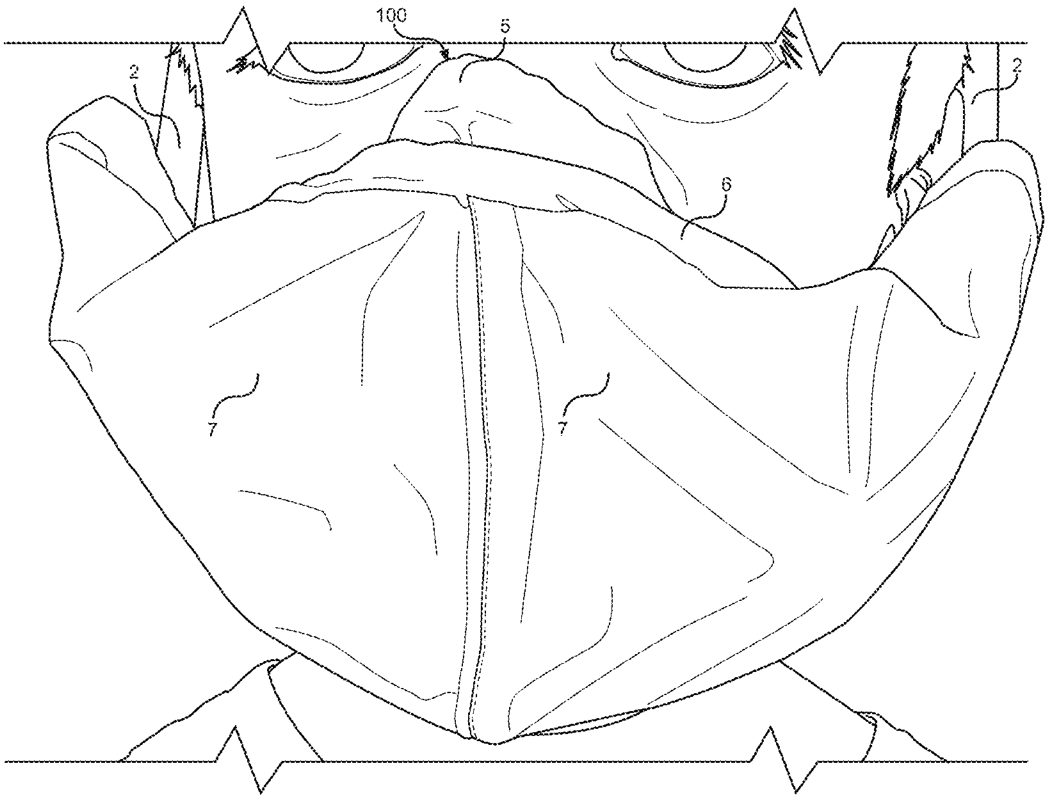
FIG. 5 shows a front view of the improved respirator mask of the present invention being worn by a user.

The various embodiments of the present invention will hereinafter be described in conjunction with the appended drawings.

DETAILED DESCRIPTION

As discussed above, embodiments of the present invention relate to an improved respiratory mask used to filter hazardous pollution and airborne germs and viruses.

The improved respiratory mask of the instant invention comes with three ties, which is unique in the art. In addition to the standard mask piece, front panel 7, there is an additional nose panel 4 with a nose aperture 5 in the middle. The inner margin of the nose panel facing the nose has a soft flange. The nose aperture is drawn together with a bridging elastic tie 3 which is threaded through the hollow third hem 9 of the nose panel 4, and which continues through the hollow hem portions hems at the bottom of the left and right panel portions 8 to emerge at the point where the front panel 7 and left and right panel portions 8 meet at the bottom. The width of the nose aperture is adjustable. The third tie 3 is tied behind the head and below the jaws of the user. The elastic third tie 3 can be tightened as necessary to ensure snug fit, wherein said nose panel is separable from and movable with respect to said front panel, such that said nose aperture can be pulled away from said front panel and adjustably placed around the nose of a user; and wherein said nose aperture is adapted to form a seal around a substantial portion of said user's nose.

One centimeter above the apex of the nose aperture 5 is the first hem 6, wherein the front panel 7 continues downwardly therefrom. The nose panel 4 can also have a vertical fold on each side where it becomes the left and right panel portions 8. The front panel 7 also has a middle fold 17 to enable it to take a concave shape to fit the contour of the face. The first set of ties 1 are tied behind the head above the ears. In addition, there is a second set of ties 2, which keep the mask snug against the face. The second set of ties 2 are tied above the head.

The mask may be made of 3 or 4 layers. An absorbent layer will line all surfaces in contact with the skin, and an impermeable layer will line the surfaces facing the outside environment. The filter layer will be between the two. In the case of the nose panel, this arrangement may include two absorbent layers, hence making the mask 4 layers in parts.

A variant will be to make the front panel from an impermeable material, and allowing air exchange only through the left and right panel portions 8. This will prevent direct impact of absorbed particles on the nose and the mouth.

Uniqueness of the design of RM Respirator:

1. The nose panel is adapted for a leak free fit and to prevent fogging;
2. The adjustable nose aperture with flanges is for adjustability and a tighter seal;
3. The three-tie design;
4. The "drawstring configurations" for the nose aperture and left and right panel portions allows the mask to be adjusted according to the wearer's anatomy;
5. Points 1-4 individually and collectively are unique.

Referring now to the preferred embodiment, and as illustrated in FIGS. 1-6, the improved respirator mask 100 comprises a front panel 7 including a top edge portion, a bottom edge portion, and two side edge portions, wherein the two side edge portions are spaced from one another and are connected between the top edge portion and the bottom edge portion; a nose panel 4 including a top edge portion connected to the top edge portion of the front panel forming a first hem 6, two side edge portions respectively connected to the two side edge portions of the front panel forming a pair of second hems 12, a bottom edge portion that includes a hollow third hem 9 along the length thereof, a nose aperture 5 that splits the bottom edge portion in half and extends vertically upwards therefrom and forms a left and right panel portions 8, wherein the left and right panel portions 8 are connected to one another adjacent the top edge portion of the nose panel 4; a first set of elongated ties 1, each including a proximal end and a distal end, wherein the proximal end of each of the first set of elongated ties 1 are respectfully attached to opposite end portions of the first hem 6, wherein the first set of elongated ties 1 are adapted to be wrapped around a user's neck, and wherein the distal ends are adapted to be removably connected to one another after being wrapped around said user's neck; a second set of elongated ties 2, each including a proximal end and a distal end, wherein the proximal end of each of the second set of elongated ties are respectfully attached to a middle portion of the pair of second hems 12, and wherein the distal ends are adapted to be removably connected to one another after being wrapped over the user's head; and a third elongated tie 3 including a proximal end and a distal end, wherein the third elongated tie is threaded through the hollow third hem 9 and extends outwardly from both ends thereof, and wherein the proximal end and the distal end are adapted to be removably connected to one another after being wrapped around the user's neck below the first set of elongated ties, wherein the improved respirator mask 100 is adapted to be adjustably and releasably secured against the face of a user surrounding their mouth and nose.

The nose aperture 5 of the improved respirator mask further includes edge portions 14 formed from a compressible material that is also an absorbent material adapted to contact the skin of a user. The front panel 7 may further include a vertical pleat 17 extending from the top edge portion to the bottom edge portion along a middle portion thereof, and is adapted to form two separate front panel portions. The front panel 7 is formed to include an inner layer 102 formed from an absorbent material adapted to contact the skin of said user, an outer layer 106 formed from an impermeable material adapted to contact the environment, and a middle layer 104 formed from filtering material adapted to filter air passing therethrough and located in between the inner layer and the outer layer. Like the front panel, the nose panel 4 also includes an inner layer 102 formed from an absorbent material adapted to contact the skin of said user, an outer layer 106 formed from an impermeable material adapted to contact the environment, and a middle layer 104 formed from filtering material adapted to filter air passing therethrough and located in between the inner layer and the outer layer. The nose panel 4 may further include a cover layer 108 adapted to cover the outer layer 106 of the nose panel and formed from an absorbent material adapted to contact the skin of said user.

The absorbent inner layer 102 of the front panel 7 and the absorbent inner layer 102 of the nose panel 4 can be formed from cotton, linen, wool, fleece, bamboo, hemp, flannel and any combination thereof. The impermeable material of the outer layer 104 of the front panel 7 and the nose panel 4 are adapted to be impermeable to liquids. The filtering material of the middle layers 104 of the front panel 7 and the nose panel 4 may be formed from between 1 and 3 micron filtering material. The first and second set of elongated ties (1 and 2) and said third elongated tie 3 may be formed from cotton, nylon, plastic, hemp, and combinations thereof.

Figure 6:
FIG. 6 shows a side view of the improved respirator mask of the present invention being worn by a user.
Figure 7:
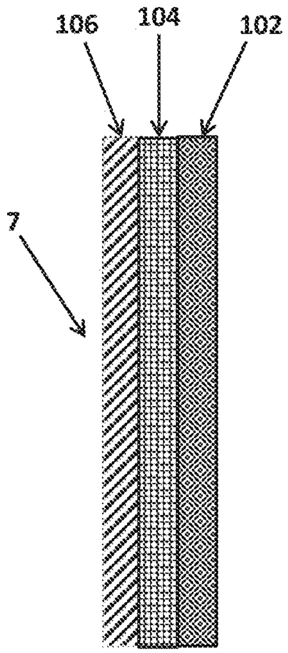
FIG. 7 shows a cross-sectional view of the three layer configuration of the improved respirator mask of the present invention.
Figure 8:
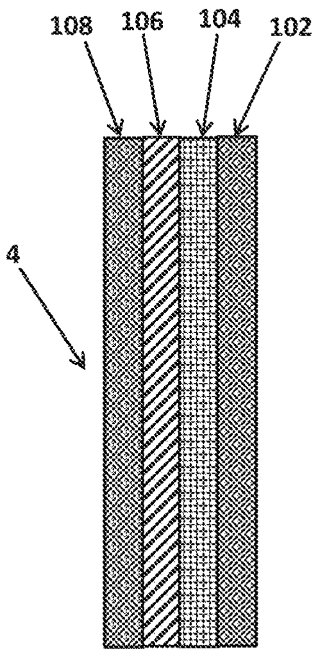
FIG. 8 shows a cross-sectional view of the four layer configuration of the nose panel of the improved respirator mask of the present invention.

In use, and best shown in FIG. 6, the user first places the nose aperture 5 around their nose and then ties the first set of ties 1 around their neck. From there, the proximal and distal ends of the third tie 3 are pulled to adjust the shape of the nose aperture 5 (via the hollow third hem 9) to the desired shape to fit snugly and comfortably around the nose of the user, and then are attached around the neck of the user below the first set of ties 1. Finally, the proximal and distal ends of the second set of ties 2 are attach above the top of the head of the user for a secure fit of the improved respirator mask 100 around the head and face of the user.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. An improved respirator mask comprising:
- a front panel including:
  - a top edge portion;
  - a bottom edge portion;
  - two side edge portions;
    - wherein said two side edge portions are spaced from one another and are connected between said top edge portion and said bottom edge portion;
- a nose panel including:
  - a top edge portion;
    - wherein said top edge portion is connected to said top edge portion of said front panel forming a first hem;
  - two side edge portions;
    - wherein said two side edge portions are respectively connected to said two side edge portions of said front panel forming a pair of second hems;
  - a bottom edge portion;
    - wherein said bottom edge portion includes a hollow third hem along the length thereof;
  - a nose aperture;
    - wherein said nose aperture splits said bottom edge portion in half and extends vertically upwards therefrom and forms:
      - a left panel portion; and
      - a right panel portion;
      - wherein said left and right panel portions are connected to one another adjacent said top edge portion of said nose panel;
  - wherein said nose panel is movable with respect to said front panel, such that said nose aperture can be pulled away from said front panel and adjustably placed around the nose of a user; and
  - wherein said nose aperture is adapted to form a seal around a substantial portion of said user's nose;
- a first set of elongated ties, each including:
  - a proximal end; and
  - a distal end;
  - wherein said proximal end of each of said first set of elongated ties are respectfully attached to opposite end portions of said first hem;
  - wherein said first set of elongated ties are adapted to be wrapped around a said user's neck; and
  - wherein said distal ends are adapted to be removably connected to one another after being wrapped around said user's neck;
- a second set of elongated ties, each including:
  - a proximal end; and
  - a distal end;
  - wherein said proximal end of each of said second set of elongated ties are respectfully attached to a middle portion of said pair of second hems; and
  - wherein said distal ends are adapted to be removably connected to one another after being wrapped over said user's head; and
- a third elongated tie including:
  - a proximal end; and a distal end;

wherein said third elongated tie is threaded through said hollow third hem and extends outwardly from both ends thereof, and wherein said proximal end and said distal end are adapted to be removably connected to one another after being wrapped around said user's neck below the first set of elongated ties;

wherein said improved respirator mask is adapted to be adjustably and releasably secured under said user's chin and against the face of a user surrounding their mouth and nose.

2. The improved respirator mask of claim 1, wherein said nose aperture includes edge portions formed from a compressible material.

3. The improved respirator mask of claim 1, wherein said front panel includes a vertical pleat extending from said top edge portion to said bottom edge portion along a middle portion thereof, which defines two separate front panel portions, and enables said front panel to form a concave shape when in use to fit the contour of said user's face.

4. The improved respirator mask of claim 1, wherein said front panel includes:

an inner layer formed from an absorbent material;

wherein said inner first layer is adapted to contact the skin of said user;

an outer layer formed from an impermeable material;

wherein said outer layer is adapted to contact the environment; and a middle layer formed from filtering material:

wherein said middle layer is adapted to filter air passing therethrough; and wherein said middle layer is located in between said inner layer and said outer layer; and wherein said nose panel includes:

an inner layer formed from an absorbent material;

wherein said inner first layer is adapted to contact the skin of said user;

an outer layer formed from an impermeable material;

wherein said outer layer is adapted to contact the environment; and a middle layer formed from a filtering material:

wherein said middle layer is adapted to filter air passing therethrough; and wherein said middle layer is located in between said inner layer and said outer layer.

5. The improved respirator mask of claim 4, wherein said nose panel further includes:

a cover layer formed from an absorbent material:

wherein said cover layer is adapted to cover said outer layer of said nose panel.

6. The improved respirator mask of claim 2, wherein said compressible material of said edge portions of said nose aperture is formed from an absorbent material adapted to contact the skin of said user.

7. The improved respirator mask of claim 4, wherein said absorbent inner layer of said front panel and said absorbent inner layer of said nose panel are formed from a material chosen from a group of materials consisting of cotton, linen, wool, fleece, bamboo, hemp, flannel, and combinations thereof.

8. The improved respirator mask of claim 4, wherein said impermeable material of said outer layer of said front panel and said nose panel are adapted to be impermeable to liquids.

9. The improved respirator mask of claim 4, wherein said filtering material of said middle layers of said front panel and said nose panel are formed from 1 micron filtering material.

10. The improved respirator mask of claim 1, wherein said first and second set of elongated ties and said third elongated tie are formed from a material chosen from a group of materials consisting of cotton, nylon, plastic, hemp, and combinations thereof.

* * * * *